No. 668,590. Patented Feb. 19, 1901.
W. R. SPRUILL, Sr. & W. R. SPRUILL, Jr.
BALL BEARING FOR VEHICLE WHEELS.
(Application filed May 23, 1900.)
(No Model.)

Witnesses
F. E. Alden
H. H. Riley

Inventors
W. R. Spruill Sr.
W. R. Spruill Jr.
by C. A. Snow & Co.
Attorneys

THE NORRIS PETERS CO., PHOTO-LITHO., WASHINGTON, D. C.

UNITED STATES PATENT OFFICE.

WILLIAM R. SPRUILL, SR., AND WILLIAM R. SPRUILL, JR., OF COLUMBIA, NORTH CAROLINA.

BALL-BEARING FOR VEHICLE-WHEELS.

SPECIFICATION forming part of Letters Patent No. 668,590, dated February 19, 1901.

Application filed May 23, 1900. Serial No. 17,728. (No model.)

*To all whom it may concern:*

Be it known that we, WILLIAM R. SPRUILL, Sr., and WILLIAM R. SPRUILL, Jr., citizens of the United States, residing at Columbia, in the county of Tyrrell and State of North Carolina, have invented a new and useful Ball-Bearing for Vehicle-Wheels, of which the following is a specification.

The invention relates to improvements in ball-bearings for vehicle-wheels.

The object of the present invention is to improve the construction of ball-bearings for vehicle-wheels, more especially that shown and described in Patent No. 634,150, granted to us October 3, 1899, and to provide an exceedingly simple and inexpensive one which will reduce the friction to a minimum, effectually exclude dust, and enable the lubricant to be delivered upon the cones, whereby it will be thoroughly and uniformly distributed to the balls.

The invention consists in the construction and novel combination and arrangement of parts hereinafter fully described, illustrated in the accompanying drawings, and pointed out in the claim hereto appended.

Figure 1:
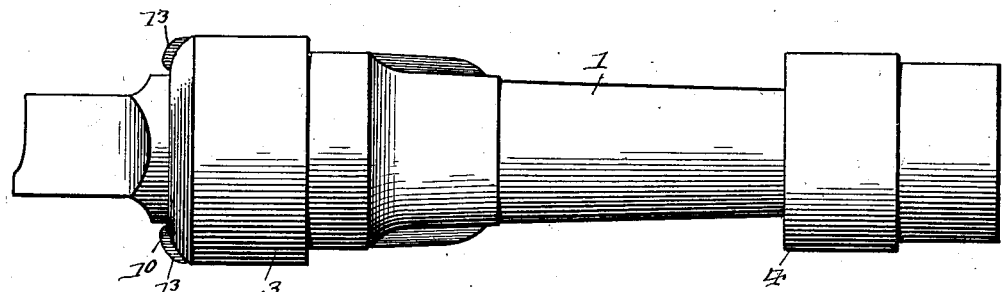
Figure 2:
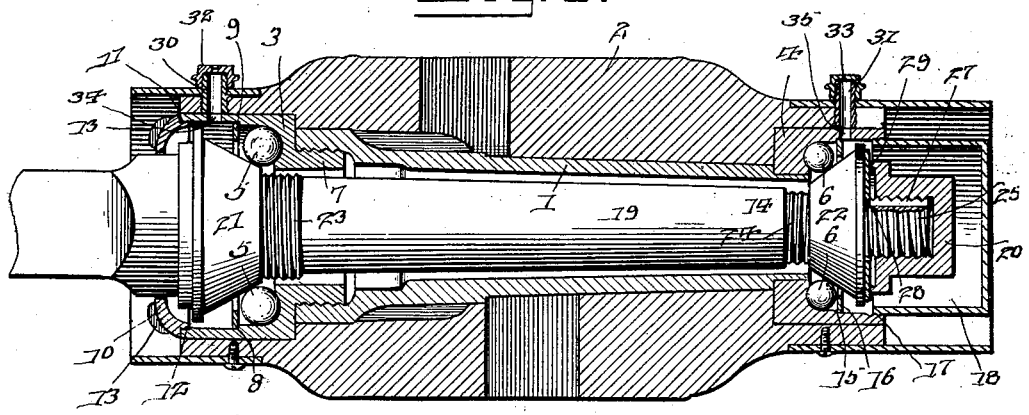
Figures 3, 4, 5:
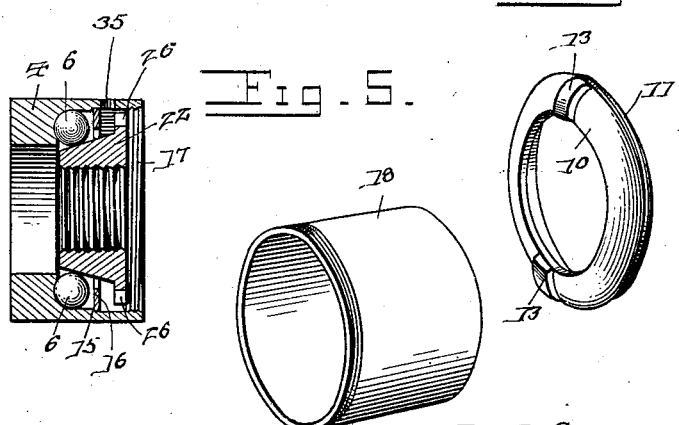

In the drawings, Figure 1 is an elevation of a ball-bearing axle constructed in accordance with this invention. Fig. 2 is a longitudinal sectional view of the same. Fig. 3 is a detail sectional view of the outer bearing. Fig. 4 is a detail perspective view of the inner annular dust-cap. Fig. 5 is a similar view of the outer dust-cap.

Like numerals of reference designate corresponding parts in all the figures of the drawings.

1 designates an axle-box secured within the hub 2 in the usual manner and connected at its inner and outer ends with ball-cups 3 and 4, which are substantially cylindrical and which receive balls 5 and 6. The inner ball-cup is provided at its inner end with an annular groove forming a ball-race, and an exteriorly-threaded annular flange 7 extends from the inner end of the ball-cup 3 into the enlarged end of the axle-box 1 and engages interior screw-threads thereof, as clearly shown in Fig. 2 of the drawings. The outer portion of the inner ball-cup is extended and recessed to provide a shoulder 8 for a retaining-ring 9, located near the center of the ball-cup 3, and the outer end of the extended reduced portion of the said ball-cup 3 is engaged by an inner annular dust-cap 10, curved in cross-section and exteriorly threaded and reduced at its outer periphery at 11 to engage the interior screw-threads 12 of the ball-cup 3. The annular dust-cap is arranged on the axle at the inner end of the spindle, as clearly shown in Fig. 2, and it is provided with exterior lugs 13, adapted to be engaged by a suitable tool for screwing the dust-cap 10 on and off the inner ball-cup.

The outer ball-cup 4, which is arranged on the reduced outer end 14 of the axle-box 1, is provided with an annular groove to form a ball-race, and it is extended outward and interiorly reduced to form a shoulder 15, against which abuts a retaining-ring 16, located near the center of the ball-cup. The outer extended portion of the outer ball-cup is provided with interior screw-threads 17, which are engaged by exterior screw-threads of an approximately cylindrical dust-cap 18, which fits over the outer end of the spindle 19 and over the axle-nut 20 to exclude effectually all dust, moisture, and other accumulation from the bearing. The inner and outer ball-cups are constructed substantially the same, as will be readily apparent, and the retaining-rings prevent the balls from escaping from the cups when the wheel is removed from the axle.

The inner and outer annular series of anti-friction-balls bear against inner and outer cones 21 and 22, the inner cone 21 being preferably arranged on an inner threaded portion 23 of the spindle 19. The outer end of the spindle is provided with inner and outer threaded portions 24 and 25, the inner threaded portion 24 being provided with left-hand screw-threads for the reception of the interiorly-threaded cone 22, which is provided with peripheral recesses 26 for the reception of a suitable tool for enabling the cone to be screwed on and off the axle. The outer threaded portion 25 of the right-hand spindle 19 is provided with right-hand screw-threads for the reception of the axle-nut, and the ends of the axle will have their screw-threads arranged in the usual manner to prevent the normal rotation of the wheels from operating to unscrew the axle-nuts. The outer portion of the spindle is also provided with a longitudinal groove 27 for the reception of a lug 28 of a washer or ring 29, which is interposed between the axle-nut and the cone to prevent the former from affecting the adjustment of the latter.

In order to enable the oil or other lubricant to be uniformly distributed to the bearings, the hub is provided with oil-tubes 30 and 31, located at the inner and outer ends of the hub at points opposite the outer or high portions of the cones, as clearly shown in Fig. 2, and these tubes, which are provided with suitable caps 32 and 33, communicate with perforations 34 and 35 of the ball-cups and are located beyond the retaining-rings. By this construction the oil is delivered to the cones and is caused to be evenly and uniformly distributed to the balls and the bearings are effectively lubricated.

It will be seen that the ball-bearing for vehicle-wheels is exceedingly simple and inexpensive in construction, that it is adapted to enable a lubricant to be effectively and advantageously distributed to the balls by discharging it upon the cones, and that the inner and outer dust-caps effectually close the ends of the bearing.

What is claimed is—

A ball-bearing for vehicle-wheels comprising an axle-box, ball-cups arranged at the ends of the axle-box and having extended portions, balls arranged within the ball-cups, retaining-rings also arranged in the ball-cups near the center thereof, a spindle having inner and outer threaded portions, the outer extremity of the spindle being grooved, inner and outer cones arranged on the spindle and having extended portions projecting a considerable distance beyond the balls and forming guides for directing a lubricant to the same, a washer or ring fitting against the outer cone and having a lug to engage the groove, an axle-nut engaging the washer, and inner and outer dust-caps, substantially as described.

In testimony that we claim the foregoing as our own we have hereto affixed our signatures in the presence of two witnesses.

WILLIAM R. SPRUILL, Sr.
WILLIAM R. SPRUILL, Jr.

Witnesses:
J. M. WIGGINS,
J. M. LE ROY.